May 13, 1958 S. SORENSEN 2,834,318
ATTACHMENT FOR MILKING MACHINES
Filed March 14, 1956
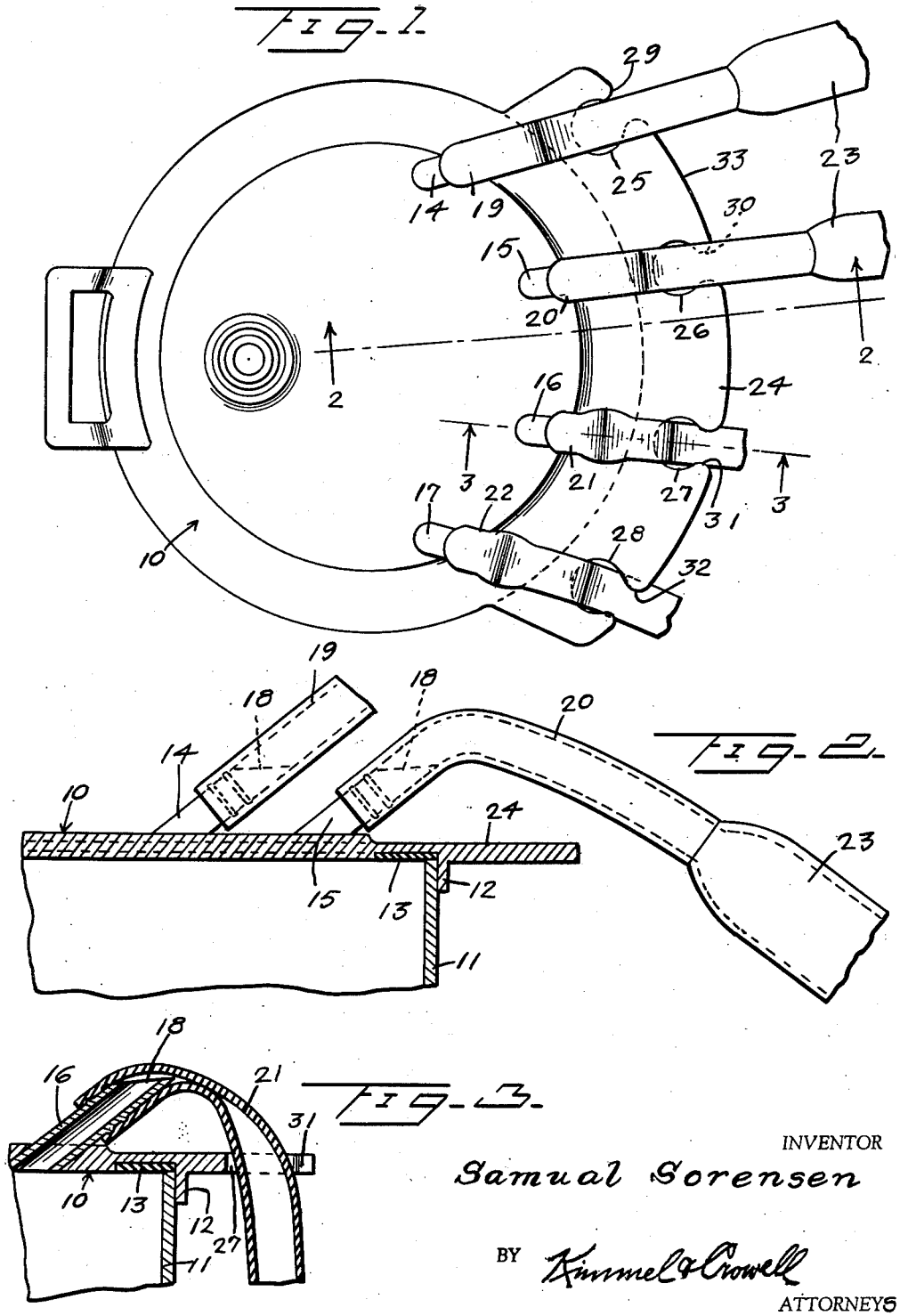
INVENTOR
Samual Sorensen
BY
Kimmel & Crowell
ATTORNEYS

United States Patent Office 2,834,318
Patented May 13, 1958

2,834,318
ATTACHMENT FOR MILKING MACHINES

Samual Sorensen, Sioux City, Iowa

Application March 14, 1956, Serial No. 571,481

1 Claim. (Cl. 119—14.45)

The present invention relates to attachments for milking machines, and more particularly, to attachments for supporting the teat cups when not in use.

The primary object of the invention is to provide a teat cup support bracket attachment for milking machines which will support the teat cup with the conduit in closed position barring pasasge of foreign material therethrough.

Another object of the invention is to provide a teat cup support bracket which can be used to support a teat cup with a minimum of effort required to position the cup therein.

A further object of the invention is to provide a device of the class described which will be inexpensive to manufacture, positive in its action, and durable in dairy use.

Other objects and advantages will become apparent in the following specification when considered in the light of the attached drawings, in which:

Figure 1 is a plan view of the invention.

Figure 2 is an enlarged fragmentary vertical cross-section taken along the line 2—2 of Figure 1, looking in the direction indicated.

Figure 3 is an enlarged fragmentary vertical cross-section taken along the line 3—3 of Figure 1, looking in the direction indicated.

Referring now to the drawings in detail wherein like reference numerals indicate like parts throughout the several figures, the reference numeral 10 indicates generally a cover of a milking machine which is supported on the top of a milk container 11 and is provided with a depending flange 12 surrounding the upper edge of the container 11. A gasket 13 is positioned under the cover 10 so as to engage the top edge of the container 11 to provide an effective seal.

The cover 10 is provided with four teat cup attaching conduits 14, 15, 16 and 17 which extend through the cover 10 as illustrated in Figure 3 and project outwardly therefrom at an angle. The conduits 14, 15, 16 and 17 are tubular in construction and have their outer upper ends bevelled at a substantial angle as indicated at 18 with the bevelled end 18 lying approximately parallel to the cover 10.

Flexible teat cup tubes 19, 20, 21 and 22 are mounted over each of the conduits 14, 15, 16 and 17, respectively, and are each provided with a teat cup 23 integrally joined to its outer end. The construction described above is conventional and is the device to which the invention its attached.

An arcuate plate 24 is integrally formed with the cover 10 forming a segmental radial extension for the cover 10. The arcuate plate 24 extends a substantial distance beyond the depending flange 12 of the cover 10 and is provided with a plurality of bores 25, 26, 27 and 28 extending vertically therethrough. A reduced neck portion 29, 30, 31 and 32 joins the outer edge 33 of the plate 24 with the bores 25, 26, 27 and 28, respectively, as best illustrated in Figure 1.

Each of the flexible tubes 19, 20, 21 and 22 having the teat cup 23 thereon are adapted to be pressed through the reduced neck portions 29, 30, 31 and 32, respectively, so as to seat within the respective bores 25, 26, 27 and 28 as illustrated in Figure 3.

Referring particularly to Figure 3, it should be noted that the tube 21, illustrative of all of the tubes, is caused to close the bevelled end 18 of the conduit 16 when the tube 21 is positioned within the bore 27 thus shutting off the flow through the tube 21.

In dairy operations, in many instances, it is found that one teat of the cow will become empty while the remaining teats are still delivering milk, and when such conditions are known the teat cup 23 attached to the empty teat is disconnected so as not to place any undue strain on the empty teat. When the teat cup 23 is detached it will normally hang loose causing a sealing action in the tube 21, however, a nervous cow can cause the tube 21 to bounce to an open position which will permit the vacuum, foreign material, odors, and other undesirable contaminants to be directed into the milk through the detached teat cup 23.

The present invention provides a device having the two-fold purpose of securing the detached teat cup 23 in a position so that it will not interfere with the milking operation and simultaneously locking the tube extending therefrom in position to close the conduit extending from the milking cover and at the same time collapsing the flexible tube so as to provide a second seal so that no vacuum reaches the teat cup 23 and no foreign material will pass therethrough into the milk.

Having thus described the preferred embodiment of the invention, it should be understood that numerous modifications and structural adaptations may be resorted to without departing from the scope of the appended claim.

What is claimed is:

A milking machine attachment comprising a relatively flat cover for said machine, a plurality of tubular conduits extending through said cover and terminating a substantial distance above said cover, said conduits having the outer ends thereof beveled at a substantial angle thereto with the beveled ends being substantially parallel to said cover, an arcuate plate projecting radially integrally from the peripheral edge of said cover adjacent said conduits, and a teat cup flexible tube connected to each of said conduits, said plate having a plurality of teat cup tube receiving bores extending therethrough with each of said bores having a reduced neck portion communicating said bore with the edge of said plate, said teat cup tubes being positioned in said bores, said tubes having bends between said conduits and said plate forming seals whereby said conduits are sealed against entry of foreign material.

References Cited in the file of this patent

UNITED STATES PATENTS

| 2,204,677 | Hodsdon | June 18, 1940 |
| 2,683,437 | Merritt | July 13, 1954 |

FOREIGN PATENTS

| 562,105 | Germany | Nov. 3, 1932 |